(12) United States Patent
Southard, Jr.

(10) Patent No.: US 6,213,491 B1
(45) Date of Patent: *Apr. 10, 2001

(54) VEHICLE TRAILER HAVING SPARE TIME ADAPTER APPARATUS

(76) Inventor: James H. Southard, Jr., 795 Condon Dr., Charleston, SC (US) 29412

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/906,372

(22) Filed: Aug. 5, 1997

(51) Int. Cl.[7] ............................................. B60D 13/00
(52) U.S. Cl. ................................. 280/475; 254/420
(58) Field of Search ........................... 280/475, 414.1, 280/414.2, 414.5; 254/420, 418; D12/162

(56) References Cited

U.S. PATENT DOCUMENTS

| D. 293,229 | * | 12/1987 | Smith ................................. D12/162 |
| D. 369,996 | * | 5/1996 | Wylie ................................. D12/162 |
| D. 399,803 | * | 10/1998 | Hilmen ............................... D12/162 |
| 3,595,527 | | 7/1971 | Douglass ............................ 254/420 |
| 3,738,613 | * | 6/1973 | Hollis, Jr. ........................... 254/420 |
| 3,851,855 | * | 12/1974 | Douglass ............................ 254/420 |
| 3,902,733 | * | 9/1975 | David ................................. 280/475 |
| 3,921,958 | * | 11/1975 | Brockelsby et al. ................ 254/420 |
| 3,934,852 | * | 1/1976 | Weber et al. ....................... 254/420 |
| 4,251,055 | | 2/1981 | Leong et al. ........................ 254/420 |
| 4,588,204 | * | 5/1986 | Reed .................................. 280/475 |
| 4,623,125 | * | 11/1986 | Ebey ................................... 254/420 |
| 4,648,617 | * | 3/1987 | Hannappel ......................... 280/289 |
| 4,702,458 | * | 10/1987 | Kendrick .............................. 254/97 |
| 4,799,648 | * | 1/1989 | Holm et al. ........................ 254/420 |
| 4,824,133 | * | 4/1989 | Wilson ............................. 280/414.1 |
| 4,978,104 | * | 12/1990 | Gibson, Jr. ......................... 254/420 |
| 5,067,692 | * | 11/1991 | Nudd et al. ........................ 254/420 |
| 5,282,605 | | 2/1994 | Sauber ................................ 254/420 |
| 5,344,175 | * | 9/1994 | Speer .................................. 280/506 |
| 5,435,523 | | 7/1995 | Hying et al. ....................... 254/420 |
| 5,730,455 | | 3/1998 | Varnum, Sr. et al. .............. 280/475 |
| 5,813,687 | | 9/1998 | Lay et al. ......................... 280/414.1 |
| 5,823,558 | | 10/1998 | Shoquist ......................... 280/405.1 |

\* cited by examiner

*Primary Examiner*—Lanna Mai
*Assistant Examiner*—Andrew J. Fischer
(74) *Attorney, Agent, or Firm*—Nelson Mullins Riley & Scarborough

(57) ABSTRACT

A vehicle trailer is provided having an adapter apparatus for providing a temporary spare tire. Typically, the trailer will be equipped with removable brackets by which the adapter apparatus can be connected to the trailer frame. If a spare tire is needed, the adapter apparatus is positioned at a bracket adjacent the failed wheel. The adapter apparatus itself includes a rotatable wheel mounted at the distal end of an elongate jack. Actuation of the jack causes the failed wheel to be lifted from the ground. The operator can then proceed to the desired destination on the wheel of the adapter apparatus without requiring the failed wheel to be removed. In exemplary embodiments, the adapter apparatus can be used as a tongue lift when a spare tire is not required.

6 Claims, 5 Drawing Sheets

VEHICLE TRAILER HAVING SPARE TIME ADAPTER APPARATUS

BACKGROUND OF THE INVENTION

The present invention relates generally to trailers pulled behind a motor vehicle, such as boat trailers and cargo trailers. In particular, the present invention relates to trailers including a novel apparatus for conveniently providing a temporary spare tire.

Boat trailers and the like are generally equipped with at least two inflatable tires. As is commonly known, inflatable tires may occasionally fail during use. For example, the tire may become punctured by a nail or other such object. A wheel may also become inoperative due to bearing failure, even if the tire itself remains inflated. Boat trailers are particularly susceptible to bearing failure, since the trailer wheels will often be submerged as the trailer is backed down a launching ramp.

When a wheel fails, it is generally necessary to stop the trailer quickly after the failure occurs. For replacement of both tires and bearings, a conventional jack is generally situated under the trailer frame to lift the failed wheel off the ground. The tire is then removed for replacement with a spare, or to allow servicing of the bearing. The trailer is lowered before the user can proceed to the desired destination.

It will be appreciated that on-the-spot repairs of this nature are often inconvenient, particularly in adverse weather conditions. In addition, many trailer operators will not have a spare bearing on-hand when a bearing failure occurs. In this situation, it will often be necessary to leave the trailer at the location where the failure occurred while a new bearing is retrieved. As a result, the trailer may be left unattended, giving rise to increased opportunity for theft or vandalism.

SUMMARY OF THE INVENTION

The present invention recognizes and addresses the foregoing disadvantages, and others of prior art constructions and methods. Accordingly, it is an object of the present invention to provide improvements to the art of vehicle trailers.

It is another object of the present invention to provide a novel spare tire adapter apparatus for use with a vehicle trailer.

It is a more particular object of the present invention to provide a spare tire adapter apparatus that may be easily installed when a wheel failure occurs.

It is a further object of the present invention to provide a spare tire adapter apparatus that provides a temporary spare tire without removal of the failed wheel.

It is a further object of the present invention to provide a spare tire adapter apparatus that can provide a temporary spare tire upon wheel failure on either side of the trailer.

It is a more particular object of the present invention to provide a spare tire adapter apparatus that may also function as a trailer tongue lift.

Some of these objects are achieved by a spare tire adapter apparatus comprising a bracket including first and second matable elements. A jack device is also provided, including a fixed portion and an extendable portion. The second matable element of the bracket is connected to the fixed portion.

The jack device further includes a jack mechanism operative to effect axial movement of the extendable portion with respect to the fixed portion. Often, the jack mechanism may include a shock absorbing element, such as a coil spring. A wheel assembly, including an axle element and a rotatable wheel supported thereby, is connected to the extendable portion. The wheel assembly may be removably connected to the extendable portion of the jack device.

In some exemplary embodiments, the first matable element and the second matable element of the bracket comprise a tubular receiver and a protruding insertion element, respectively. The insertion element may extend from the fixed portion of the jack device at approximately a right angle. For example, the insertion element may extend from the fixed portion at a compensated right angle such that the rotatable wheel will tend to a vertical orientation as the extendable portion of the jack device is axially extended.

The first matable element of the bracket may be removably connected to the fixed portion of the jack device. Preferably, the first matable element and the fixed portion of the jack device are configured to permit connection of the first matable element in a plurality of vertical positions.

Other objects of the invention are achieved by a trailer comprising a trailer frame. The trailer frame includes a front tongue portion adapted for attachment to a vehicle and a rear load carrying portion having a plurality of wheels. A first bracket element is connected to the front tongue portion of the trailer frame. Second and third bracket elements are connected to opposite sides of the rear load carrying portion generally adjacent respective wheels thereof. Often, the load carrying portion of the trailer frame will be adapted to carry a boat.

The trailer further comprises a jack device removably connectable to the trailer frame at any one of the first, second and third bracket elements, the jack device being operative to lift the trailer frame thereat. Preferably, the jack device includes a rotatable wheel mounted at a distal portion thereof to engage a ground surface when the trailer frame is lifted.

In some exemplary embodiments, the jack device includes a fixed portion and an extendable portion axially movable with respect to one another. For example, the jack device may include a manually-cranked jack mechanism.

The first, second and third bracket elements may each comprise a tubular receiver attached to the trailer frame. In such embodiments, a protruding insertion element is preferably connected to the jack device for receipt in the tubular receiver. The insertion element may be removably attachable to the jack device in a plurality of vertical positions.

Still further objects of the present invention are accomplished by a spare tire adapter apparatus for use with a trailer comprising a receiver element mountable to a frame of the trailer. A jack device is also provided, including a proximal portion and a distal portion. The jack device has a manual cranking mechanism operative to move the distal portion toward and away from the proximal portion.

The spare tire adapter device further includes an insertion element, receivable in the receiver element, and connected to the proximal portion of the jack device. At least one locking element is provided for securing the insertion element in position with respect to the receiver element. A wheel assembly is connected to the distal portion of the jack device.

In some exemplary embodiments, the insertion element extends from the proximal portion of the jack device at approximately a right angle. Preferably, the insertion element may extend from the proximal portion at a compensated right angle. In addition, the insertion element may be removably connected to the proximal portion of the jack device, such as for attachment in a plurality of vertical positions.

The jack device may preferably comprise a fixed portion and an extendable portion axially movable with respect thereto. In such embodiments, the wheel assembly may be removably connected to the extendable portion of the jack device.

Additional objects of the invention are achieved by a spare tire adapter apparatus for use with a trailer comprising a tubular receiver element mountable to a frame of the trailer. An elongate element having a proximal portion and a distal portion is also provided. An insertion element, receivable in the tubular receiver element, is connected to the proximal portion of the elongate element to extend therefrom at approximately a right angle. At least one locking element is provided to secure the insertion element in position with respect to the receiver element. A wheel assembly, including an axle element and a rotatable wheel supported thereby, is connected to the distal portion of the elongate element.

Still further objects of the present invention are achieved by a jacking apparatus for use with a trailer. The apparatus comprises a receiver element mountable to a frame of the trailer. A jack device is also provided, including a proximal portion and a distal portion. The jack device includes a cranking mechanism operative to move the distal portion toward and away from the proximal portion. An insertion element, receivable in the receiver element, is connected to the proximal portion of the jack device. At least one locking element is provided for securing the insertion element in position with respect to the receiver element. Finally, a ground engaging element is connected to the distal portion of the jack device.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
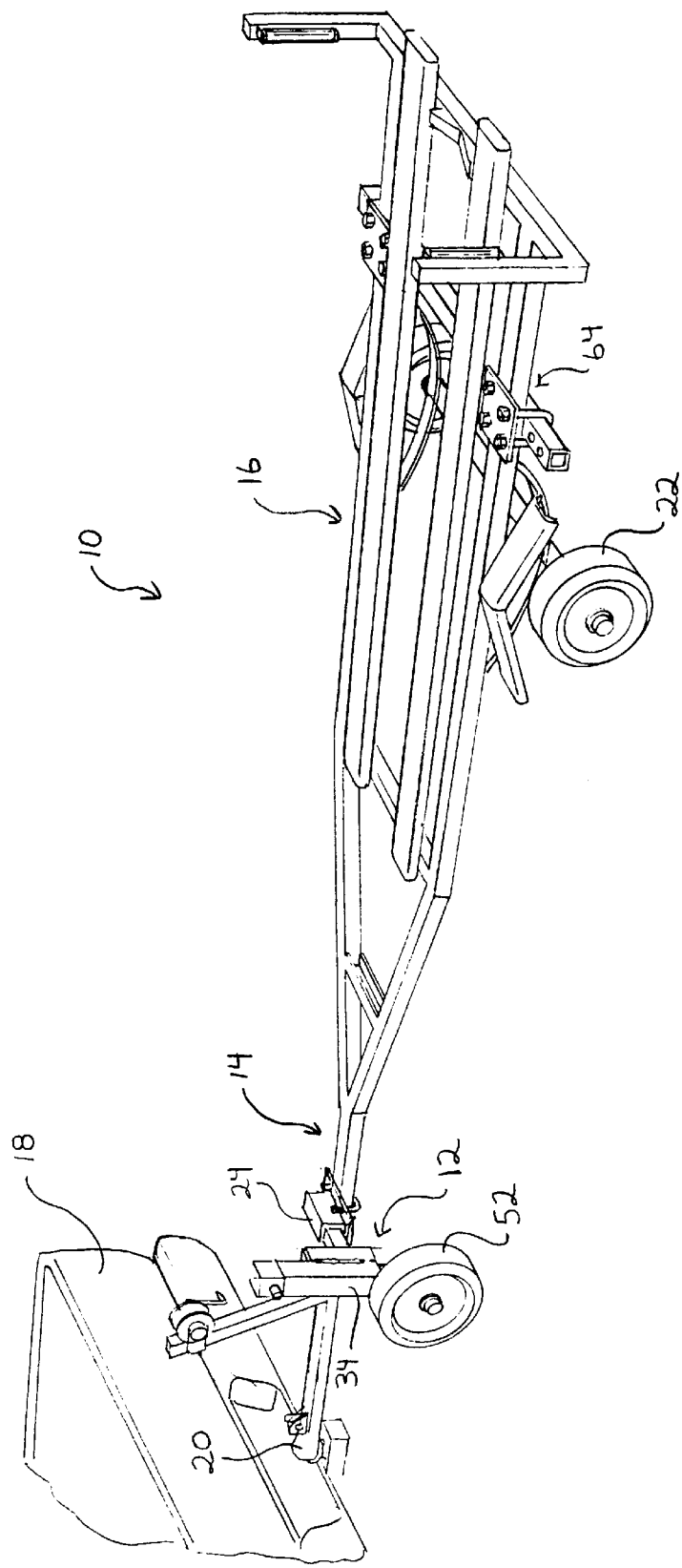
FIG. 1 is perspective view of a vehicle trailer having a spare tire adapter apparatus of the present invention installed on a front tongue portion thereof.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a vehicle trailer 10 including a spare tire adapter apparatus 12 of the present invention. Trailer 10 includes a vehicle frame having a front tongue portion 14 extending into a rear load carrying portion 16. Tongue portion 14 is connected to the back of vehicle 18 in any appropriate manner, such as utilizing a conventional ball hitch 20. As can be seen, load carrying portion 16 includes a pair of laterally disposed wheels, such as wheel 22. Load carrying portion 22 is adapted to carry the desired load, in this case a boat.

Figure 2:
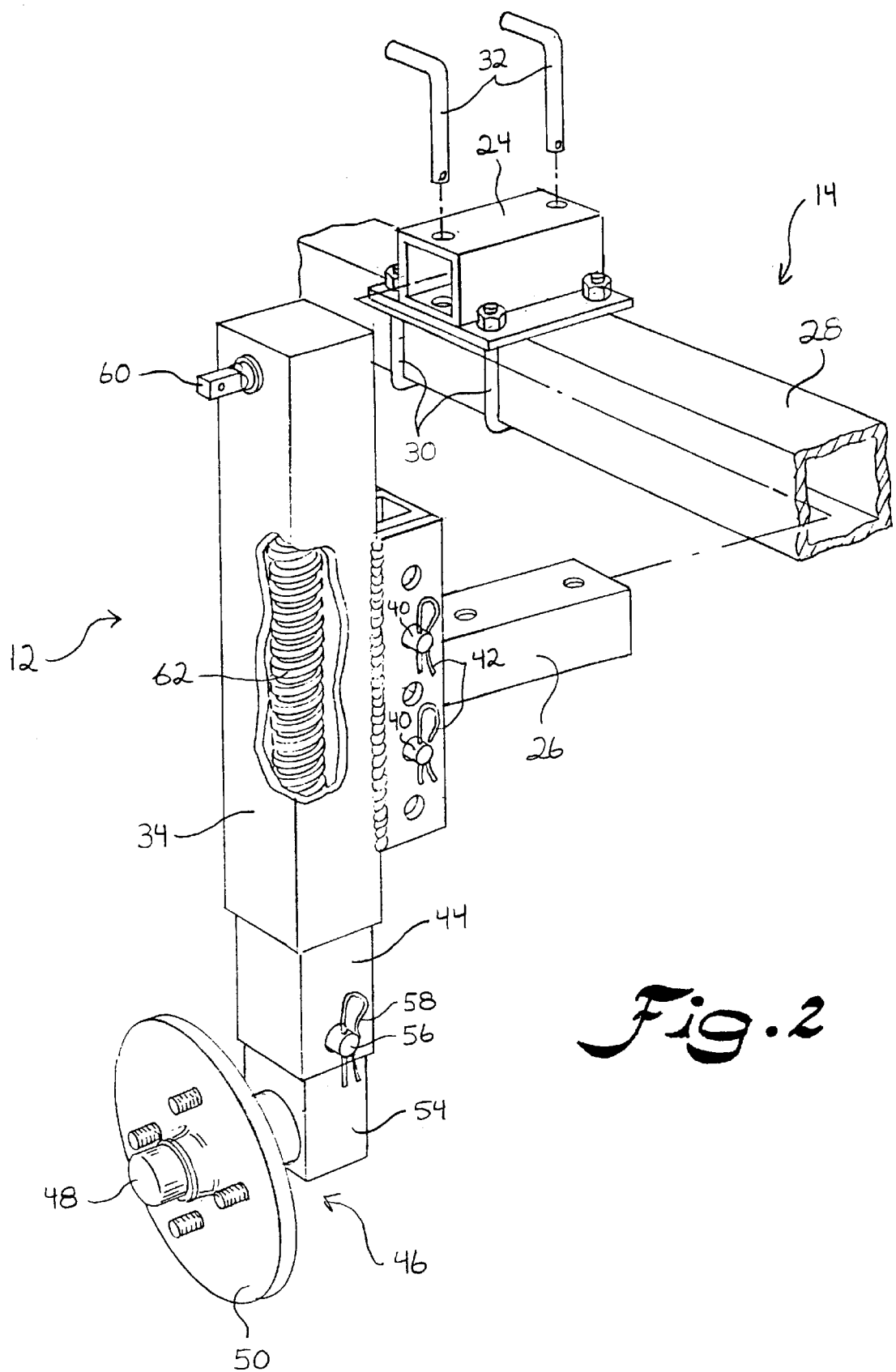
FIG. 2 is a perspective view of the spare tire adapter apparatus (without the tire) removed from the front tongue portion of the vehicle trailer.
Figure 3:
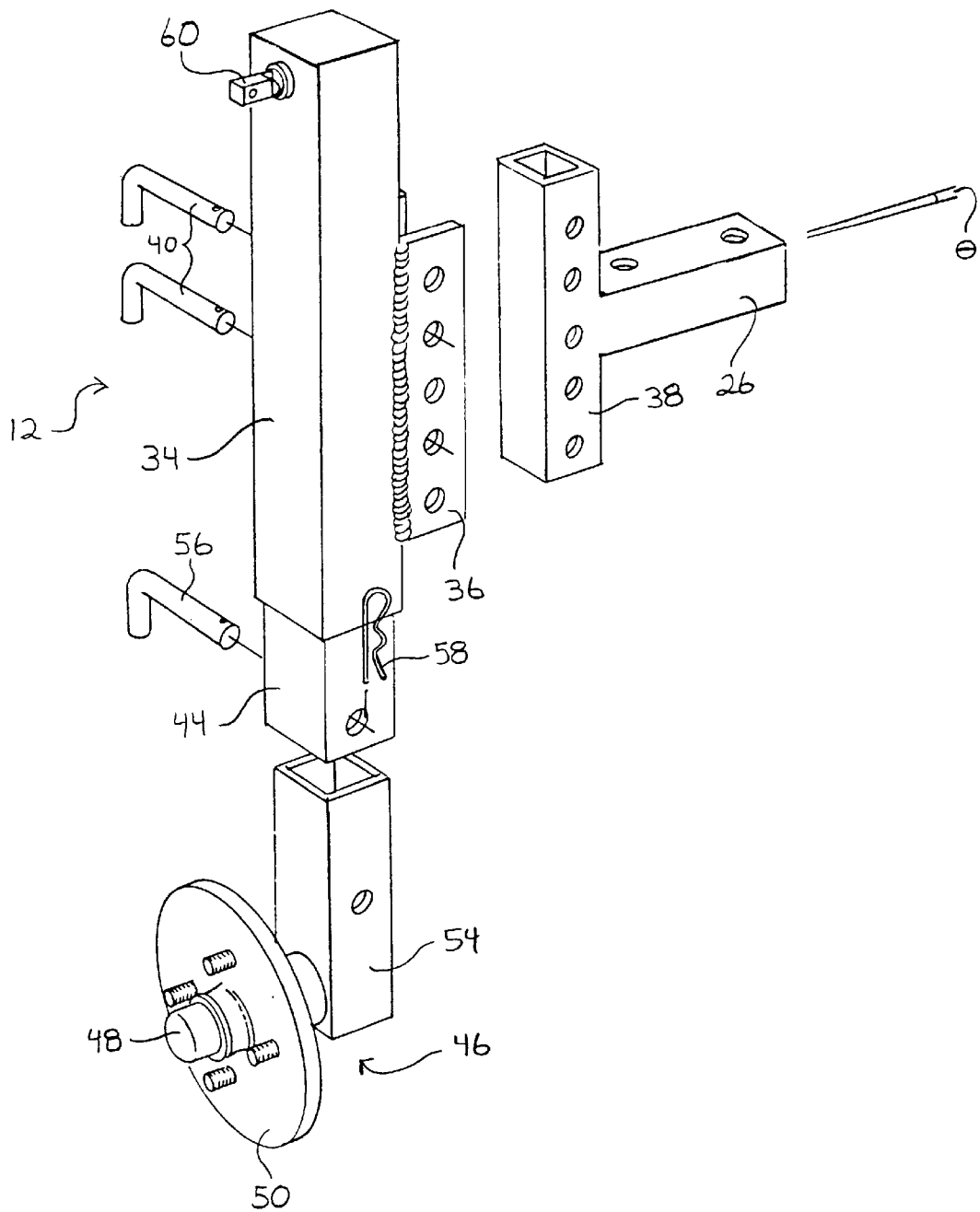
FIG. 3 is a perspective view of the spare tire adapter apparatus as in FIG. 2 and with removable parts separated.

Referring now also to FIGS. 2 and 3, further details of adapter apparatus 12 will be explained. To permit easy removal, adapter apparatus 12 is preferably connected to the trailer frame utilizing brackets having first and second mating elements. In the illustrated embodiment, for example, adapter apparatus 12 is connected to tongue portion 14 of the trailer frame utilizing a receiver element 24 and a complementary insertion element 26. Receiver element 24 is mounted to the main beam 28 of tongue portion 14 utilizing U-bolts 30. It should be appreciated that any other suitable means of effecting such attachment, such as welding and the like, can also be utilized.

Receiver element 24 defines a generally rectangular receiving socket into which insertion element 26 is accepted. When insertion element 26 is properly located within receiver element 24, holes defined in each are aligned to permit insertion of retaining pins 32. Any suitable means, such as clips, may be use to prevent pins 32 from backing out during use. Some embodiments may use spring-loaded detente mechanisms incorporated in the pins for the same purpose.

Adapter apparatus 12 includes a jack device having a fixed portion 34 to which insertion element 26 is removably connected. Toward this end, the illustrated embodiment includes a bracket 36 attached to and integral with fixed portion 34. A plurality of receiving holes are defined in bracket 36, as well as an attachment portion 38 of insertion element 26. When these holes are aligned, retaining pins 40 can be inserted therethrough. As with pins 32, pins 40 can be maintained in position utilizing clips 42 or other suitable means. It will be appreciated that this arrangement permits location of insertion element 26 in a plurality of vertical positions depending on the requirements of a particular application.

The jack device of adapter apparatus 12 further includes an extendable portion 44 telescopically received in fixed portion 34. A wheel assembly 46 is located at a distal end of extendable portion 44, as shown. Wheel assembly 46 includes a transverse axle 48 to which a mounting hub 50 is attached. An inflatable tire 52 (FIG. 1) is mounted to hub 50 during use for rotation therewith.

In the illustrated embodiment, wheel assembly 46 includes a tubular portion 54 received in the end of extendable portion 44. A retaining pin 56 may be inserted through aligned holes to maintain wheel assembly 46 in position during use. Pin 56 is itself maintained in position via clip 58 or other suitable means.

A jack mechanism of conventional construction moves extendable portion 44 axially with respect to fixed portion 34. In this case, the jack mechanism is manually actuated by rotation of a crank spindle 60. The jack device may further include a suitable shock absorber, such as coil spring 62, located within fixed portion 34.

In the arrangement shown in FIG. 1, adapter apparatus 12 may function in a manner similar to a typical tongue lift. In this location, actuation of the jack mechanism causes front tongue portion 14 of the trailer frame to be raised. The trailer can then be easily rolled toward or away from the vehicle for hitching or unhitching, as the case may be. Actuation of the jack mechanism in the opposite direction causes front tongue portion 14 to be lowered.

Figure 4:
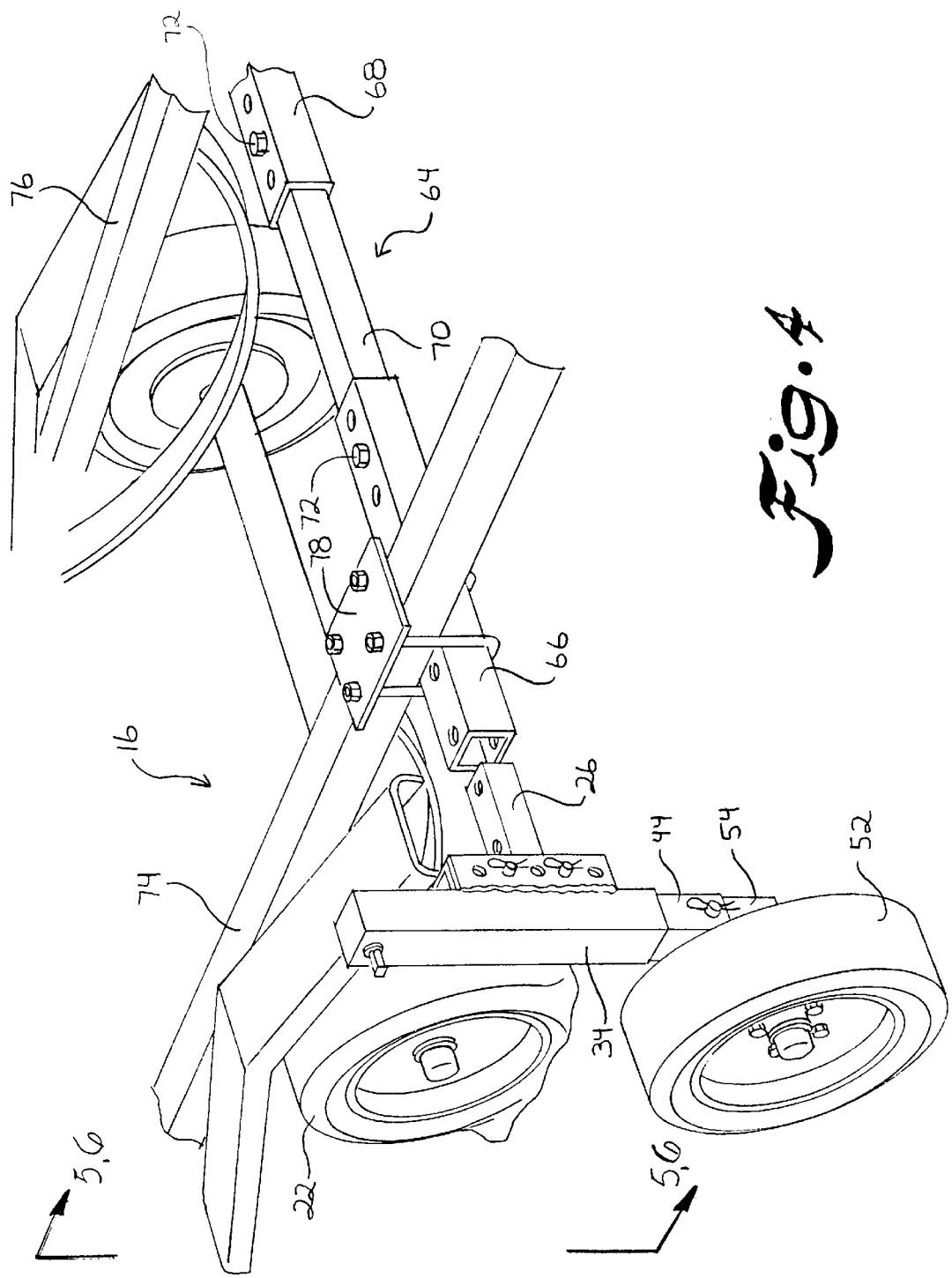
FIG. 4 is a perspective view illustrating the manner in which the spare tire adapter apparatus may be attached to the rear load carrying portion of the vehicle trailer.

Referring now to FIG. 4, adapter apparatus 12 may also be utilized to provide a temporary spare if a trailer wheel fails, such as due to a flat tire or bearing failure. In this example, tire 22 has become flat during use. Toward this end, receiving structures for insertion element 26 are preferably located adjacent each of the two wheels of rear load carrying portion 16. Although discrete receiver elements similar to receiver element 24 could be located on each lateral side of the vehicle trailer, the illustrated embodiment utilizes a cross structure 64. Cross structure 64 advantageously prevents excessive torque from concentrating during lifting on one longitudinal beam of the trailer frame.

Cross structure 64 is mounted transversely across rear load carrying portion 16, extending slightly beyond the lateral sides thereof. In the illustrated embodiment, cross structure 64 includes first and second tubular members 66 and 68 interconnected by a central rod 70. Tubular members 66 and 68 are preferably connected to central rod 70 in a manner that allows axial adjustment for different sized trailers. In this case, attachment bolts 72 are inserted into aligned holes in central rod 70 and the respective tubular members 66 and 68 for this purpose. Cross structure 64 is attached to the longitudinal beams 74 and 76 of the trailer frame by respective mounting brackets, such as bracket 78.

Insertion member 26 is received into the ends of tubular members 66 and 68 in a manner similar to receiver element 24. Toward this end, tubular members 66 and 68 will typically define holes for alignment with the holes defined through insertion member 26. Retaining pins 32 can then be used to maintain adapter apparatus 12 in position as described above.

Figure 5:
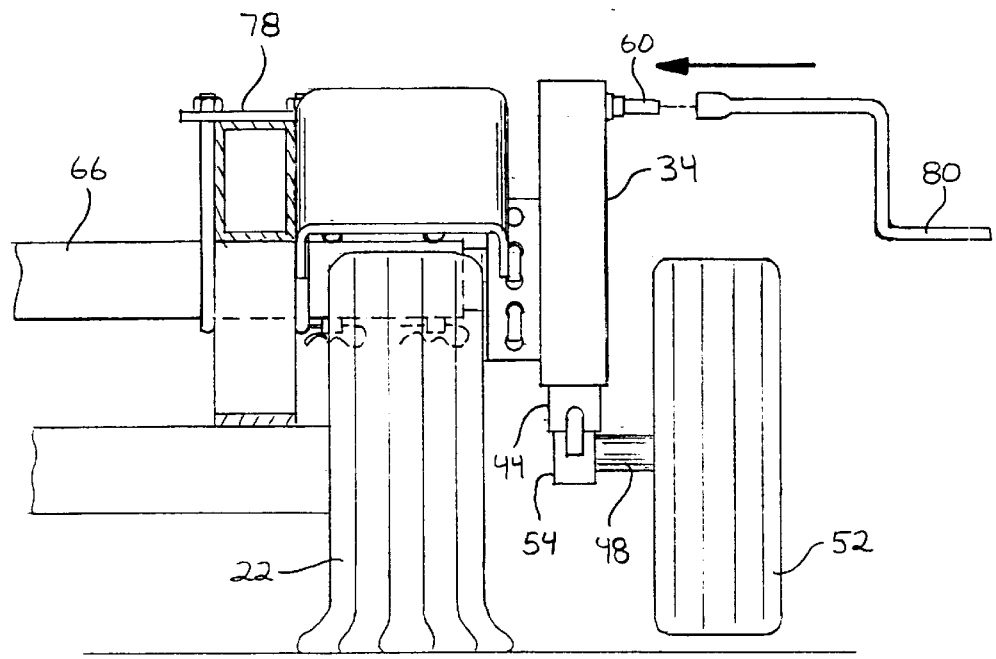
FIGS. 5 and 6 are elevational views illustrating use of the spare tire adapter apparatus to provide a temporary spare tire for the vehicle trailer.
Figure 6:
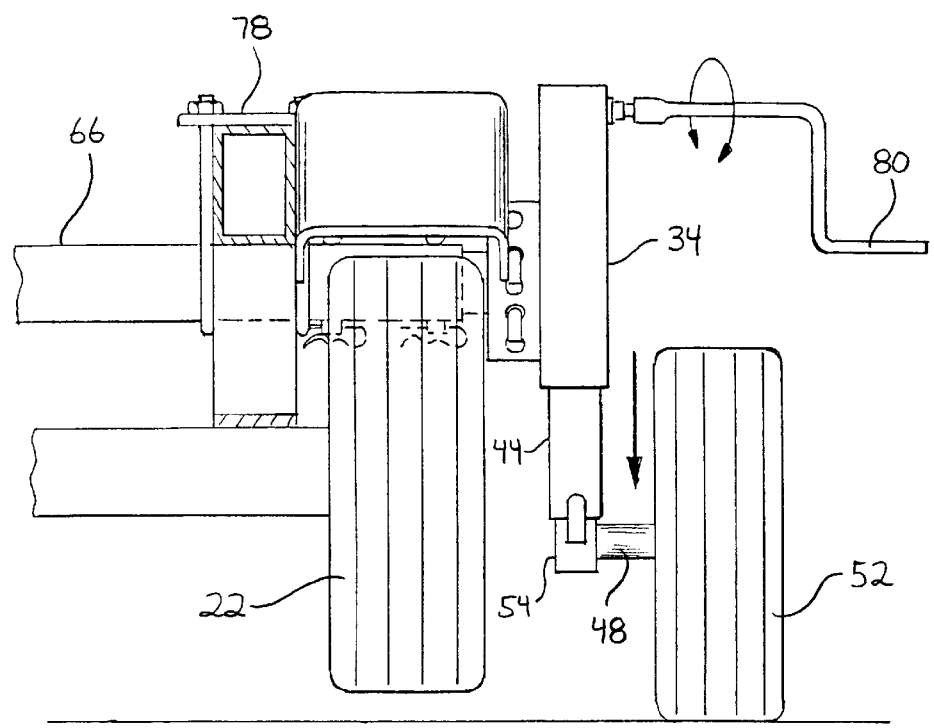

Referring now to FIGS. 5 and 6, operation of adapter apparatus 12 to provide a spare tire will be described. As shown in FIG. 5, extendable portion 44 is axially retracted into fixed portion 34 during installation of adapter apparatus 12 to the trailer frame. A conventional hand crank 80 is then positioned over crank spindle 60 in a manner well known in the art. As shown in FIG. 6, rotation of crank spindle 60 causes tire 52 to engage the ground and lift the trailer frame. The trailer frame is lifted at this location by an amount sufficient to provide adequate clearance between flat tire 22 and the ground. It will often be desirable to provide an appropriate locking mechanism to prevent counter-rotation of crank spindle 60 when tire 52 is in use.

Referring again briefly to FIG. 3, it can be seen that insertion element 26 preferably extends from fixed element 34 at a slight angle ⊖ from the horizontal. This angle ⊖, which may be referred to as a "compensated right angle," is chosen to compensate for the angle inherently produced in the trailer frame as one side is lifted by adapter apparatus 12. As a result, tire 52 will remain substantially vertical during use.

It can thus be seen that the present invention provides a versatile apparatus that can be utilized to provide a temporary spare tire for a vehicle trailer. While preferred embodiments of the invention have been shown and described, modifications and variations may be made thereto by those of ordinary skill in the art without departing from the spirit and scope of the present invention. For example, two of the described adapter devices can be utilized (one on each side of the trailer) to enable temporary use of a trailer having a broken axle. In addition, the rotatable wheel can be replaced with another type of ground-engaging element such as a plate to facilitate usage of the apparatus as a pure jack.

In addition, it should be understood that aspects of the various embodiments may be interchanged both in whole or in part. Furthermore, those of ordinary skill in the art will appreciate that the foregoing description is by way of example only, and is not intended to be limitative of the invention so further described in the appended claims.

What is claimed is:

1. A combination comprising:

a trailer including a front tongue portion adapted for attachment to a vehicle and a rear load carrying portion having at least a first and a second rear trailer wheel;

a spare tire adapter device mounted substantially adjacent to one of the first and second trailer wheels, said spare tire adapter device including:

(a) a bracket including a tubular receiver and a protruding insertion element inserted into said tubular receiver, said protruding insertion element being locked with respect to said tubular receiver;

(b) a jack device including a fixed portion and an extendable portion, said protruding insertion element of said bracket being connected to said fixed portion;

(c) said jack device further including a jack mechanism operative to effect axial movement of said extendable portion with respect to said fixed portion; and (d) a wheel assembly connected to said extendable portion, said wheel assembly including an axle element and a rotatable spare wheel supported by said axle element such that said spare wheel is parallel with a longitudinal direction of said trailer, said spare wheel including an inflatable tire located on a hub so that said spare tire adapter apparatus provides a temporary spare tire for said trailer.

2. A combination as set forth in claim 1, wherein said insertion element extends from said fixed portion of said jack device at approximately a right angle.

3. A combination as set forth in claim 2, wherein said insertion element extends from said fixed portion at a compensated right angle such that said rotatable wheel will tend to a vertical orientation as said extendable portion of said jack device is axially extended.

4. A combination as set forth in claim 1, wherein said protruding insertion element of said bracket is removably connected to said fixed portion of said jack device.

5. A combination as set forth in claim 4, wherein said protruding insertion element and said fixed portion of said jack device are configured to permit connection of said protruding insertion element in a plurality of vertical orientations.

6. A combination as set forth in claim 1, wherein said wheel assembly comprises a separate unit that may be quickly connected to and disconnected from said extendable portion of said jack device.

* * * * *